E. ROSENSTEIN.
CALCULATING DEVICE.
APPLICATION FILED FEB. 19, 1914. RENEWED SEPT. 25, 1915.
1,181,256.
Patented May 2, 1916.
*Fig. 1.*
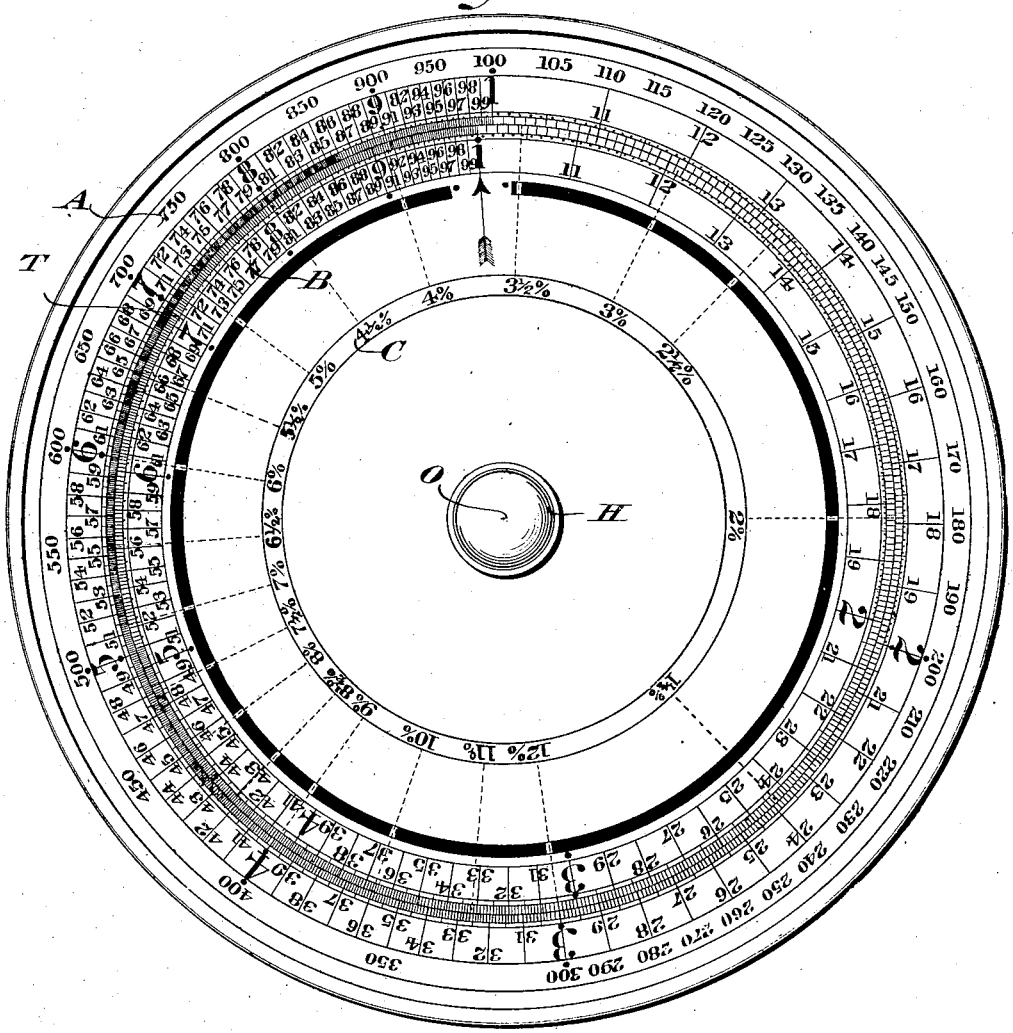
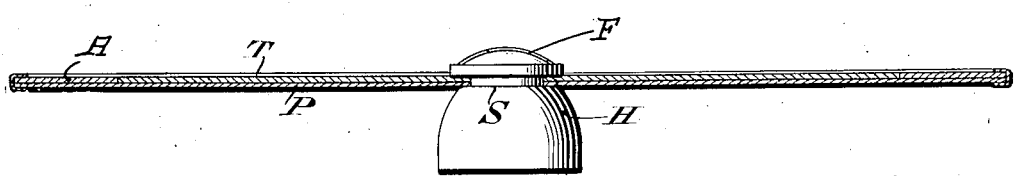
*Fig. 2.*
Witnesses
L. B. Graham
R. E. Wighton
Inventor
Ernest Rosenstein
By Heidman & Street
Attorneys

UNITED STATES PATENT OFFICE.

ERNEST ROSENSTEIN, OF CHICAGO, ILLINOIS, ASSIGNOR OF ONE-HALF TO MEIER KATZENSTEIN AND JULIUS MANSBACH, OF NEW YORK, N. Y.

CALCULATING DEVICE.

1,181,256.          Specification of Letters Patent.          Patented May 2, 1916.

Application filed February 19, 1914, Serial No. 819,689. Renewed September 25, 1915. Serial No. 52,706.

*To all whom it may concern:*

Be it known that I, ERNEST ROSENSTEIN, a subject of the Empire of Germany, and residing at Chicago, in the county of Cook and State of Illinois, have invented a certain new and useful Improvement in Calculating Devices, of which the following is a full and complete specification.

My invention relates to a device whereby mathematical computations may be accurately and quickly accomplished through the simple manipulation of the device.

The purpose of my invention is the provision of a device which will permit the rapid operations of multiplication and division, thus adapting it for commercial purposes; enabling the operator to quickly ascertain the cost of a select number of articles at a given figure per unit; or the amount of discount at a given percentage; or the amount of interest at a given percentage for a given number of days; as will be more fully hereinafter set forth in connection with a detailed description of the device as exemplified in the accompanying drawing which forms a part of my specification.

In the drawing:—Figure 1 is a plan view of the device. Fig. 2 is a sectional view of the same, with the means for holding and rotating the members shown in full lines.

In the particular exemplification of the device, it comprises an annular member or strip A, which may be secured to or made integral with the base or back-plate P. In its preferred form, the annular member or strip A is shown secured in any suitable manner to the base or back-plate P; with the inner perimeter in close contact with the perimeter of what may be termed the inner annular member or disk T, as clearly shown in the drawing, although the members might be differently arranged; it being understood, of course, that it is desirable in a device of this kind to have the two members so arranged that the surface of the inner member or disk T will be in close relation to the inner perimeter of the outer member A, in order that both members may be provided with similar graduations adapted to be brought to register with each other in a radial manner.

In order to maintain the members A and T in proper relation to each other and at the same time enable the user to easily manipulate or revolve the one member on the other, I provide the knob or member H, which may be of any desired form. In the construction illustrated, it is shown provided with a shank or spindle S, which extends through the plate or member P and is permanently secured to the inner member T in any suitable manner, so as to induce the member T to rotate with the member H and permit the member P, and with it member A, to rotate about the shank or spindle portion of member H; the end of the shank or spindle being shown provided with a flange or enlarged portion F, whereby the member T will be firmly held in place. It is evident from the construction therefore, that in use the operator grasps the outer member A and plate P with one hand and with the other hand rotates the inner member or disk T, the desired extent, so as to bring any given point or degree on the inner member into register with any given point or degree on the outer member, as will be apparent from the following examples.

As shown in the drawing, both members A and T are graduated or divided off into unequal sectors or spaces, which I will designate as the major or primary scales; the spaces or graduations being identical on both members. These graduations or major scales are indicated by the large or bold-faced type or figures running from 1 to 10, as clearly shown in Fig. 1; and in the computations or calculations may denote units, tens, hundreds, or thousands, as the case may be; for example, one may be used as the unit 1, or it may denote 10 or 100, or 1000; the other figures permitting of similar reading.

In order to obtain the length of each of the ten spaces of what I have termed the major or primary scales, and which are arranged on both members A and T, I assume the circumference of both members to be divided into a thousand equal parts or points, the graduation or figure 2 of the major scales is placed at the location or point of the assumed three hundred and first graduation or point, because .301 is the logarithm of 2 (approximately), and the graduation or figure 3 is placed at the assumed four hundred and seventy-seventh point, since .477 is the logarithm of 3 (approximately). This gives the distances or spaces between the graduations or figures 1 and 2 and between 2 and 3, respectively. The other spaces are determined in a similar manner, which will bring the graduation 10 at the point of beginning, that is at the graduation 1, the thousandth division since 1.000 is the logarithm of 10. In this manner, the graduations of what I have termed the major or primary scales are obtained.

The spaces of what I have termed as the major scales, on both members A and T are again divided up or graduated so as to provide what may be termed minor or secondary scales, which are indicated or shown in the drawing in smaller type or figures. The minor scales consist in graduating or dividing the spaces intermediate of consecutive numbers or degrees of the major scales into any desired number of fractional parts, for example, of tenths or smaller degrees; it being understood, of course, that the scales just described are identical on the different members A and T.

As is illustrated in the drawing, the spaces of the major scales on both members A and T are divided up into ten unequal parts in a manner similar to that previously described; for example, the spaces from one to two of the major or primary scales are divided into ten unequal parts numbering from 11 to 20 inclusive; the distance between the respective divisions or graduations being in proportion to the difference of the logarithms of the numbers 10, 11, 12, 13, 14, 15, 16, 17, 18, 19, and 20. The spaces intermediate of the graduations 2 and 3, 3 and 4, 4 and 5, 5 and 6, 6 and 7, 7 and 8, 8 and 9, and 9 and 1, being divided in a similar manner to that just described with reference to the space intermediate of the graduations 1 and 2; it being understood, of course, that the distance between each division or graduation is in proportion to the difference of the logarithms, that is, for example, the distances are in proportion to the logarithms of 20, 21, 22, and so on for the other seven major spaces or divisions. The spaces from 10 to 11, from 11 to 12, and so forth, throughout the entire scales, may again be divided up into ten or any other number of parts; and these spaces or degrees may again be divided into smaller spaces or divisions where the space intermediate of the degrees of the major or minor scales is sufficiently large to permit of such graduations or divisions, which, however, is not possible between the graduations 9 to 1, for example, of the major spaces. The scales on the two members as just described, are indicated by the reference characters A and B in Fig. 1.

The inner member or disk T is also provided with additional graduations or degrees shown at C in Fig. 1, concentrically arranged within the graduations or scale arranged at the perimeter of the member; said graduations or scale being preferably provided with dotted lines extending from the circles, within which the graduations or figures are located, to the perimeter of the inner member T; the dotted lines being employed so as to distinguish the same from the graduations of the other scales. This inner or third scale C, is preferably shown in the nature of percentage, being especially adapted for use in connection with figuring interest or discount on a given number or figure for a given period, or number of days.

The scale C arranged concentrically on the inner member or disk T is shown, for illustration, divided into nineteen unequal spaces which are designated by numbers representing the usual rates of interest or discount, and numbering from 1 to 12 and fractional parts; for example 1 to 1½ to 2 to 2½ to 3, etc., with the numeral 10 indicating 10% being at the same point where the percentage 1 would be located; and the space intermediate of 1, or 10, and 1½ containing the graduations or spaces 11 and 12%. These spaces are obtained by dividing the number 365, which denotes the number of days in a year, by the figure representing the percentage; for example, 1 divided into 365 equals 365; therefore, the graduation or degree 1 is placed on the inner member T at a point immediately beneath the degree 365 of the scale B at the perimeter of the inner member, namely radially in line with the point half-way between the graduations 36 and 37; the numeral 2, of this third or interest and discount scale C, to denote 2%, is placed under the graduation 182½ of the scale B at the perimeter of the inner member, namely in line with a point intermediate of the graduations 18 and 19; the graduation 18 being read as 180 plus the graduations or degrees denoting the tenth parts of the space intermediate of the degrees 18 and 19; the numeral 5 to indicate 5% of this inner or interest and discount scale C is placed at a point radially in line with the degrees 73 of the graduations of scale B at the perimeter of the inner member T, and which is identical with the scale on the outer member A, because, 365 divided by 5 equals 73.

It is apparent from the foregoing illustration that the inner scale may be divided up into any number of parts; the point of location of the graduation on said inner scale C and its value being determined by a division of 365, the number of days in a year; the graduation of the scale B indicating in this instance the number of days.

As previously stated, the figures of the primary or major scales on both members A and C are identical, and may be read consecutively so as to designate numerals 1 to 10, the numeral 1 being considered as 10 or 100, in which latter case, 11 would then be read as 110, 12 as 120, and so on, with the smaller graduations intermediate of the consecutive numerals indicating a single unit or tenth part; for example, 1 being read as 100, the next degree, which indicates a tenth part of the space intermediate of 1 and 11, being read as 101 and so on, or being read as 1010 as the case may be. Furthermore, the graduations or figures may be read as fractions, as for example, the figure 15 may be read as designating 1.5 (or 1½) of the primary or major scale; the fifth degree following the numeral 15 of the secondary or minor scale may be read as 15.5 (or 15½) of the secondary or minor scale; or the fifth degree following the numeral 15 might be read as 1.55 on the major scale, etc.

To illustrate the operation of my device, we will assume that the inner member or disk T is rotated so as to bring the numeral 1, or initial point of the scale B, beneath the numeral 2 of the scale on the outer member A, then 1 is to 2 as 3 is to 6, or 12 is to 24, etc. It is evident, therefore, that the figure or graduation of the scale B on inner member T is multiplied by 2 on the scale of the outer member A; or differently stated, the value of the numeral on scale B is increased 100%.

If the numeral 1 of the scale B on the inner member is brought to register with the numeral 15 of the scale on the outer member A, then the various figures of the scale B on the inner member C are multiplied by 15, or 1.5, thus raising the figures of the scale B 50%. For example, with the numeral 1 of the scale B beneath the numeral 15 of the outer member or scale A, 2 of the scale B on the inner member is brought to register with 3, which is now read as 30 on the outer member A, thus evidencing the fact that 2 has been multiplied by 15; where it is desired to raise the figures 50%, then the graduations are read as follows:—15 of the scale on outer member A is read as 1.5, with which 1 of the scale B on the inner member is made to register, thereby bringing the numeral 2 of the scale B on the inner member to register with 3 on the outer member A, thus raising the figure 2 50%, and so on with the different figures or degrees.

As further illustrations of the manner in which the calculator may be employed, we will assume that it is desired to multiply 19 by 16. For an operation of this kind, the inner member is rotated so as to bring the initial point or 1 of the scale B on the inner member into register with the graduation or numeral 16 of the scale on the outer member A. In order to ascertain the result, we look for the graduation on the outer member registering with the graduation 19 of the scale B on the inner member, and we will find that 19 registers with the fourth degree or graduation following the numeral 30, which is now read as 300, so that the result of the multiplication is found to be 304.

As an illustration of an example of division, we will assume that it is desired to divide 391 by 17. For an operation of this sort, the graduation or number 17 of the scale B of the inner member is brought to register with the graduation or degree 391 of the scale on the outer member A. The result of this operation is found by noting the number on the outer member A which registers with the degree or number 1 of the scale B. On the other hand, the result may be obtained by bringing the number 17 of the scale B to register with the number 1 on the outer member A, in which event the result of the division will be found on scale or member A, at the point which registers with or is found over the number 391 on the inner scale B.

As an example of the use of the device in connection with the rule of three, we will assume that the cost of 144 articles is $19.20, and it is desired to ascertain the cost of 78. The member T is rotated so as to bring the graduation 144 of the scale B to register with the graduation 19.20 on the outer member (19.20 would be found by taking the second degree following the numeral 19 on the outer, while 144 would be the number 14 on the inner member plus the fourth degree following) and the result will be found on the outer member A over the degree or numeral 78 of the inner member, which will be in register with the fourth degree following the degree numbered 1, which in this instance is read as 10, thus indicating the cost of 78 articles as $10.40.

The inner scale C of percentage on the inner member is merely employed when it is desired to figure interest or discount for a given number of days; in which event the rate of interest is placed beneath or in register with the amount on the scale or member A which corresponds with and designates the principal. In examples of this kind, the figures on the scale B at the perimeter of the inner member will represent the number of days and the interest or discount will be indicated on the scale of the outer member A in register with the graduation on the scale B at the perimeter of the inner member, denoting the days for which the computation is made; for example, in order to find the amount of interest on $560 at 8% for 53 days, the inner member is rotated so as to bring the graduation of the innermost circle or scale C, designated as 8% into register with the graduation on the outer member A designating the principal 560; the result will be found on the scale of the outer member at the point registering with the degree numbered 53 of the scale B at the perimeter of the inner member, namely it will be found to register with the fifth degree following the number 6 of the primary or major scale, thus indicating the interest to be $6.50.

As an illustration of the method of employing the device where it is desired to ascertain the amount of discount on a given invoice or figure, we will assume that the invoice totals $1265 and a discount of 2¾% is given for thirty days, or any other number of days. The inner member is rotated so as to bring the initial point or figure 1 of scale B below the graduation on the outer member A equivalent to 1265, namely at a point half-way between the 6th and 7th degree following the graduation numbered 12 of the scale on the outer member A which is now read as 1200, while the smaller degrees are read as tens, namely 60 and 70. In order to ascertain the result, it is necessary to find the degree with which the graduation equivalent to 275 of the scale B on the inner member registers (2¾ being equivalent to 2.75) and it will be seen that 275 comes at a point slightly in advance of the eighth degree following the number 34 on the scale of the outer member A, indicating that the discount amounts to $34.79—. Suppose the cost of packing, freight, and duty on an invoice of $1265 amounted to $414 and the merchant desires to ascertain the percentage to be added to the cost of each article. In a case of this kind, the amount $414 is indicated by the scale B at the perimeter of the inner member, namely the fourth degree following the number 41 which is read as 410, and the smaller degrees as units; and this degree is brought to register with the graduation indicating 1265 on the outer member. The percentage will be found beneath the graduation numbered 1 on the outer member A, which will be found to be the 7th degree or graduation following the numeral 32 on the scale B, thus indicating the percentage to be added as $32\tfrac{7}{10}$, so that a single article of the shipment invoicing $1 would show the total cost of freight, etc., to amount to $1.32\tfrac{7}{10}$.

The device may be made of any suitable material, as for example thin sheets of celluloid, paper, sheet metal or glass, and be made of any desired size; furthermore its construction may be altered in certain minor respects without, however, departing from the spirit of my invention, and I do not wish to be understood, therefore, as limiting myself to the exact construction shown and described.

What I claim is:—

1. A device of the class described, comprising a pair of concentrically mounted members arranged so as to have the surfaces of both members visible from the face of the device and provided with circumferentially arranged scales or spaced graduations, the graduations on the one member being arranged so as to come within the circle described by the graduation or scale on the other member, the spacing of the graduations being primarily determined by dividing the circles on the members described by the graduations into one thousand equal parts and placing said graduations at distances apart proportionate to the differences of the logarithms of the consecutive numbers beginning with one, the degrees or spaces on both members being identical and normally in radial alinement with one another, and an inner circle or third scale graduated into unequal spaces and denoting percentage, said graduations being determined by dividing the number of days in the year, say three hundred and sixty-five, by a selected number and placing the selected number at a point in radial alinement with the degree or graduation of the first mentioned scales corresponding with the quotient of the division, said graduations being arranged in a direction opposite to the graduations of the other scales, with the spaces between the graduations of the third scale being arranged to decrease as the spaces between the graduations of the other scales increase.

2. A circular calculating device comprising a pair of circular members provided with circular scales concentrically arranged, and a third scale consisting of a series of numbers representing the usual rates of interest or percentage set relative to and concentric with said circular scales, said second mentioned scale being determined by dividing a selected number on the adjacent scale of said first-mentioned scales by a number on the third scale, denoting percentage, and placing the quotient in radial alinement with the graduation or number of said adjacent scale corresponding thereto.

ERNEST ROSENSTEIN.

Witnesses:
  GEORGE HEIDMAN,
  R. E. WIGHTON.